United States Patent Office 3,463,461
Patented Aug. 26, 1969

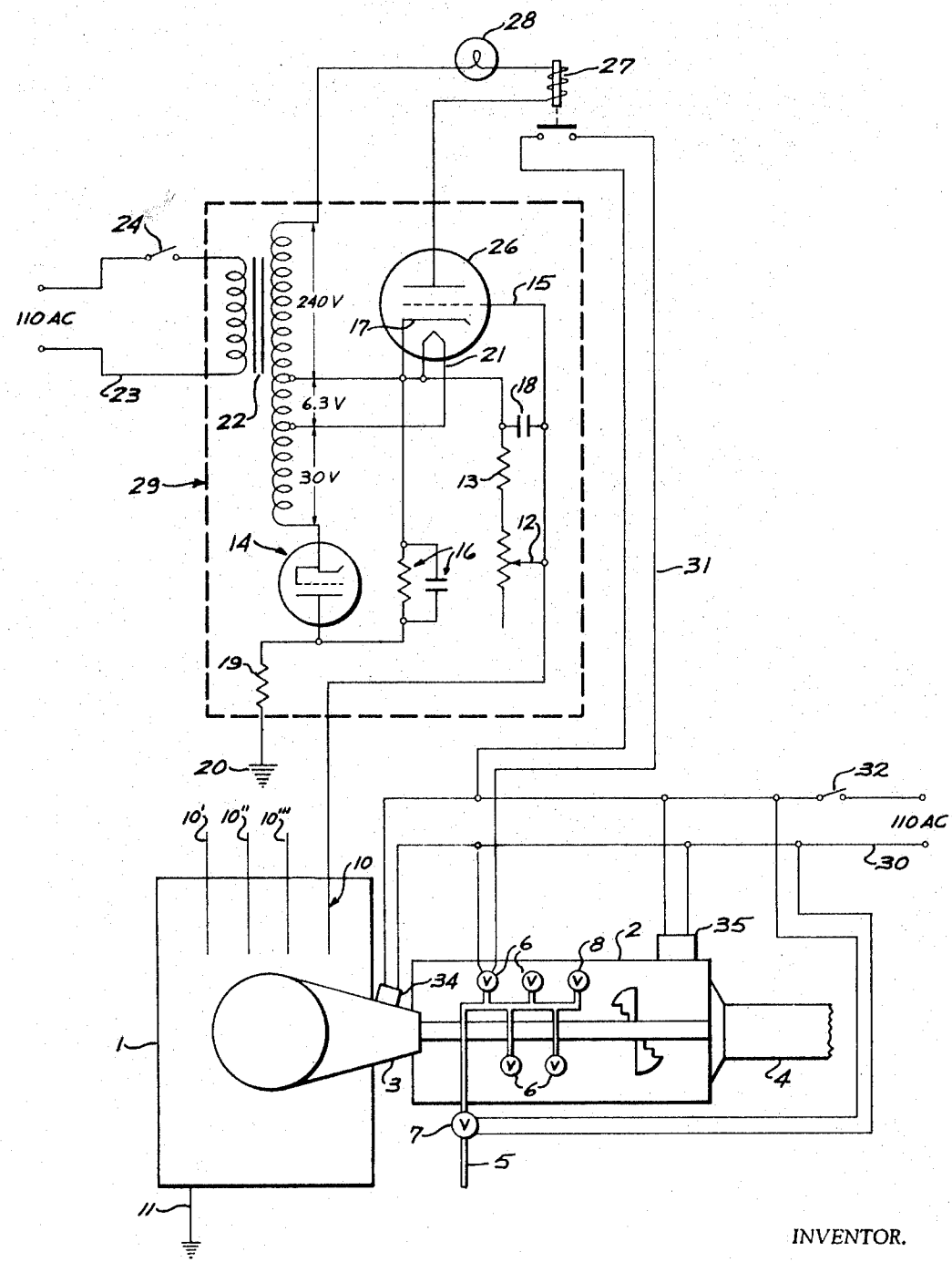

3,463,461
AUTOMATIC TEMPERING
Joseph M. Kirk, Jr., Bessemer, Ala., assignor to Dresser Industries Inc., a corporation of Delaware
Filed Mar. 28, 1966, Ser. No. 537,740
Int. Cl. B28c 7/04
U.S. Cl. 259—154                                    4 Claims

ABSTRACT OF THE DISCLOSURE

Apparatus for adding controlled amounts of a fluid to a granular material wherein the addition of the fluid is controlled by at least one valve operated by an electrical circuit. The electrical circuit employs the electrical conductivity of the granular material as a measure of the fluid already present in the granular material and in turn operates at least one valve to add additional material to the granular fluid if necessary.

---

This invention relates to an apparatus and method for automatically tempering a water deficient raw brickmaking batch having variable water content to prepare it for pressing.

One of the most important steps in the manufacture of high quality clay brick by pressing is the tempering of the size graded raw brickmaking batch with moisture and bonding agents so that it can be suitably pressed. In most brick plants, the clay is taken directly from mines or outdoor storage, sized and placed in a source bin. Therefore, the moisture content of the clay in the bin varies considerably. When the tempering is preformed manually, an operator observes the "feel" of the batch being delivered from a mixer and adjusts the rate of water addition to compensate for the variation in moisture in the batch in the source bin. The smaller the deviation of the moisture content in the tempered batch, the more uniform the pressed shapes appear in density and size. Moisture control also produces a favorable effect on the production efficiency.

Several devices for automatically controlling the moisture content of tempered brickmaking batches have been suggested. These devices operate by recording the moisture of the batch as it is leaving or has left the mixer where tempering occurs. Therefore, any control is limited to the batch remaining in the mixer and unsuitable batches will be delivered to the press.

It is therefore, an object of this invention to provide an apparatus for automatically tempering brickmaking batches which do not deliver an unsuitable batch to the press. It is another object of this invention to provide an automatic tempering device which is inexpensive to install and maintain and which does not require delicate instrumentation that may be vulnerable to the dusty atmosphere of a brickmaking plant. It is a further object of this invention to provide a method for automatically tempering a brickmaking batch so that it will have substantially uniform moisture content.

The typical apparatus for tempering a brickmaking batch to prepare it for pressing includes a source bin for holding the batch, a mixer which may be a pugmill or a muller type mixer, an automatic feeder between the bin and the mixer, and a water source for directing water into the mixer.

This invention is based upon the fact that the moisture content and electrical conductivity of a refractory brickmaking batch are directly related.

Briefly, in accordance with the invention, there is provided one or more electrically controlled (i.e., solenoid) valve operated water sources directed into the batch mixer. The electrical conductivity of the batch in the bin is determined by an electrical circuit means operatively associated with the raw batch and the electrically controlled valves. As the conductivity of the batch increases and decreases, the electrical circuit means causes the water valves to open and close to maintain the water content of the batch in the mixer at a uniform selected level.

More specifically, there is provided a sensing circuit including the batch as a resistance element and a power source. The sensing circuit cooperates with a gate circuit which contains a power source, a relay switch and an adjustable electrical gate. The gate circuit deactuates the relay when the electrical current in the sensing circuit falls below preset levels. A relay circuit including a power source and the electrically controlled valve cooperate with the gate and sensing circuit through the relay switch to allow water flow to the batch in the mixer.

This invention will be understood more clearly by careful study of the following detailed description with reference to the drawing. The drawing is a schematic representation of the mixing apparatus and exemplary electrical circuits used for controlling the moisture content of the tempered batch.

The tempering apparatus

In the diagram, the source bin 1 containing the brickmaking batch of variable moisture content, is shown connected to a mixer or pugmill 2 by an automatic vibratory feeder 3. A belt 4 is shown (in part) for delivering the tempered batch to the presses (not shown). A conduit 5 for delivering water to the pugmill is shown thereabove. The conduit contains a plurality of solenoid operated normally closed water valves 6 positioned along the conduit above the pugmill to deliver water thereto and a main solenoid operated valve 7 to control water flow to the valves 6. Each valve 6 is operated by a separate control circuit hereinafter described. Valve 8 is manually operated.

The sensing circuit

Basically, the sensing circuit comprises the grid circuit of a triode 26 and the resistance through the batch within the bin. More specifically, the sensing circuit comprises a probe 10 inserted into the bin near the base thereof, the batch within the bin which is grounded at 11, a potentiometer 12 for biasing the grid, a fixed resistance 13, and direct current power source which substantially comprises a diode 14 and a resistance-capacitance filtering circuit 16 for converting alternating current to direct current. The sensing circuit includes a capacitor 18 and a resistor 19 and is grounded at 20. The cathode heating circuit is shown as 21. It should be understood that this invention includes a plurality of sensing circuits, the probes of which are shown in the drawing as 10′, 10″ and 10‴. Each sensing circuit is preset at a different electrical conductivity level as it relates to water content level. The voltage supplied to the sensing circuit is about 30 volts and is supplied by transformer 22. Current is supplied to the transformed by circuit 23, which can be disconnected by switch 24.

The gate and relay circuits

Basically, the gate circuit comprises the plate circuit of a triode 26, a relay 27, an indicator 28 and a source of direct current which it shares with the sensing circuit. The voltage across the plates in the triode 26 is about 240 volts. The portions of the sensing and gate circuits contained within the dotted line 29 are available as a commercial unit. One such unit is sold by General Electric Corporation as G. E. Electronic Relay GR75 11 A1 26 G1. 110 volt AC current is supplied at 30 to the relay circuit 31, including the solenoid valves 7. This current is controlled by switch 32. The same switch controls the current which actuates the motor 34 of the vibration feeder 3 and the motor 35 of the pugmill 2 and the main valve 7.

Operation of the sensing, gate and relay circuits

As the moisture content of the batch within the bin decreases, the electrical resistance between a probe and the bin is increased. Therefore, the total resistance in a sensing circuit is increased and the current flowing through the circuit is decreased. This in turn decreases the voltage between the grid 15 and the cathode 17. The potentiometer 12 is adjusted so that the grid voltage will exceed the threshold voltage of the triode when the moisture in the batch within the bin reaches a desired level. This level is made different for each sensing circuit. Until the threshold voltage of the triode 26 is overcome, no current flows through the plate circuit, which allows relay 27 to remain deactivated and leaves circuit 31 open. This allows the normally closed solenoid valve 6 to remain closed which in turn cuts off water flow into the batch. As the moisture content of the batch in the bin decreases to the preset level of succeeding sensing circuits, the threshold voltage of each triode 26 is overcome and direct current flows through the plate circuit which activates relay 27 to connect circuit 31 thereby opening succeeding solenoid valves seriatim.

Technique for adjusting the tempering device

The moisture content of the batch within the bin usually varies over a range from 2–4%. Where four sensing and relay circuits and four solenoid operated valves are used, one gate circuit would be adjusted to emit a signal when the batch within the bin contained about 2% water. The other circuits would be set to emit signals when the moisture content of the batch in the bin is about 2⅔%, 3⅓% and 4%. This would be accomplished by trial and error adjustment of the potentiometer 12. Below each of the solenoid valve 7 is a variable adjustment valve (not shown in the drawing) which controls the amount of water dispersed into the mill 2 through that valve. These adjustment valves are preset to allow only sufficient water to be added to the batch to bring its moisture content to the desired level, for example, 6%. This is also accomplished by trial and error. The manual valve 8 must be similarly adjusted so that the moisture content of the batch in the mixer will be raised to the selected level when all solenoid operated valves are closed.

Preferably, the current within relay circuit 31, which activates the solenoid valve 8, is controlled by the same manual switch that activates the vibrator motor 34 and pugmill motor 35. This prevents water from being fed to the mill when brickmaking batch is not also being fed to the mill.

If segregation of the grain sizes occurs within the batch in the source bin, it will be reflected by the probe and the moisture content at the discharge end of the mill will be effected accordingly. With an excess of coarse grain material the moisture content will drop; and with an excess of fine grain material the moisture will increase. This can be overcome by installing smaller compartments or "egg crates" within the bin. Attaching a vibrator to the bin, which is energized momentarily every few minutes of operation of the pugmill, also helps to avoid segregation. The vibrators should be wired so that they are not operated when the pugmill is stopped to prevent possible packing of the batch within the bin.

Another desirable feature is a bin level detector to insure continuity of the feed material to the pugmill. Also desirable is an overload switch on the pugmill motor to insure that no excessive overload is placed on the motor.

Data collected over a period of several months shows that automatic tempering using the control device disclosed in this specification is superior to tempering manually. The moisture content of the tempered batch varied over a range of 1% with manual operation. However, automatic tempering reduced this variation to less than about ½%.

Beside the obvious advantage of eliminating the need for a pugmill operator, it was found that the efficiency of the press was increased as the variation in the material decreased. Additional advantages to be expected are an increase in press mold life, less stress on the press, and consequently, longer maintenance-free production time.

While the invention has been described with regard to specific embodiments and examples, it should be understood that modifications, substitutions and the like may be made therein without departing from its scope.

Having thus described the invention in detail and with sufficient particularly as to enable those skilled in the art to practice it, what is desired to have protected by Letters Patent is set forth in the following claims.

I claim:

1. In apparatus for tempering a raw brickmaking batch of variable moisture content to prepare said batch for pressing with a substantially uniform selected moisture content comprising a source bin, a mixer, an automatic feeder between the bin and the mixer; at least one normally closed electrically controlled valve-operated water source in communication with the mixer, and electrical circuit means operatively associated with the raw batch in the bin and the valve operated water source for measuring the electrical conductivity thereof and opening the valve when the conductivity of the batch falls below a present level so that the moisture content of the batch in the mixer is increased to a substantially uniform selected level, said circuit means comprising at least one sensing circuit in electrical contact with the batch in the bin, a gate circuit in cooperation with the sensing circuit, a relay means and means for deactivating the relay means, and a relay circuit in cooperation with said gate circuit including said relay, a power source, and said electrically controlled valve so that variances in moisture content are matched by operation of said electrically controlled valve.

2. The apparatus of claim 1 in which the circuit means comprises at least one sensing circuit including the batch in the bin as a resistance element and a constant voltage power source; an adjustable gate circuit in cooperation with the sensing circuit including a power source, a relay switch and an adjustable gate means for deactivating the relay switch when the current in the sensing circuit falls below a preset amount; a relay circuit in cooperation with the gate circuit including said relay and a power source and the electrically controlled valve such that as the moisture content of the batch decreases, the electrically controlled valve opens to raise the moisture content of the batch in the mixer to a uniform selected level.

3. The apparatus of claim 2 in which the circuit means comprises a plurality of sensing circuits, gate circuits and relay circuits in the same cooperation which are preset at different valves to open and close seriatim to maintain the moisture content of the batch in the mixer at a uniform selected level.

4. The apparatus according to claim 1 in which the electrically controlled means are solenoid operated and the circuit means comprises a plurality of moisture sensing circuits comprising a DC power source, external resistance probes within said source bin and the grid circuit of a triode and a potentiometer for biasing the grid; a plurality of gate circuits in cooperation with said moisture sensing circuits consisting of a DC power source, a relay switch and the plate circuit of a triode; a plurality of relay circuits in cooperation with said gate circuits comprising a relay switch and the solenoid operated normally closed valve in the water source; such that as the moisture content of the brickmaking batch in the bin progressively raises or lowers thereby raising or lowering its conductivity, the currents in the moisture sensing circuits decrease or increase thereby decreasing or increasing the grid voltage above or below preset grid bias voltages in the triodes seriatim thereby deactivating or activating the DC current in the relay circuit and thereby closing or opening the relay switches which activated the solenoid valve circuit activating or deactivating the solenoids in the normally closed water valves seriatim.

References Cited
UNITED STATES PATENTS

| | | | |
|---|---|---|---|
| 3,161,927 | 12/1964 | Dietert | 259—154 |
| 3,172,175 | 3/1965 | Hartley | 259—154 X |

ROBERT W. JENKINS, Primary Examiner